(12) United States Patent
Adam et al.

(10) Patent No.: US 11,773,124 B1
(45) Date of Patent: Oct. 3, 2023

(54) HOMOLIPTIC DINUCLEAR COMPLEXES OF PALLADIUM (II) WITH DIAROYLDIHYDRAZONE SUCCINATE LIGAND AS HIGHLY EFFECTIVE CATALYST FOR CROSS COUPLING REACTIONS

(71) Applicant: KING FAISAL UNIVERSITY, Al-Ahsa (SA)

(72) Inventors: Mohamed Shaker S. Adam, Al-Ahsa (SA); Obadah S. Abdel-Rahman, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/119,153

(22) Filed: Mar. 8, 2023

(51) Int. Cl.
*C08F 132/08* (2006.01)
*C07F 15/00* (2006.01)

(52) U.S. Cl.
CPC .............................. *C07F 15/0066* (2013.01)

(58) Field of Classification Search
None
See application file for complete search history.

(56) References Cited

U.S. PATENT DOCUMENTS

| 2011/0245240 A1 | 10/2011 | Staas et al. |
| 2014/0243314 A1 | 8/2014 | Qiao et al. |
| 2021/0324118 A1 | 10/2021 | Sundell et al. |
| 2021/0403634 A1 | 12/2021 | Kropp et al. |

FOREIGN PATENT DOCUMENTS

CN 114057601 A 2/2022

OTHER PUBLICATIONS

Journal of Organometallic Chemistry, 903, 120985 (Year: 2019).*
Sobhani et al., "Pd-isatin Schiff base complex immobilized on v-Fe2O3 as a magnetically recyclable catalyst for the Heck and Suzuki cross-coupling reactions," Chinese Journal of Catalysis, vol. 36, Issue 4, Apr. 2015, pp. 555-563.
Pakvojoud et al., "Efficient, selective and mild oxidation of sulfides and oxidative coupling of thiols catalyzed by Pd(II)-satin Schiff base complex immobilized into three-dimensional mesoporous silica KIT-6," Journal of Sulfur Chemistry , vol. 41, 2020—Issue 5.

* cited by examiner

*Primary Examiner* — Yun Qian
(74) *Attorney, Agent, or Firm* — Nath, Goldberg & Meyer; Richard C. Litman

(57) ABSTRACT

A homeleptic dinuclear palladium (II) complex, a method of using the homoleptic dinuclear palladium (II) complex, and a method of making the homoleptic dinuclear palladium (II) complex are provided. The homoleptic dinuclear palladium (II) complex has improved catalytic effectiveness and increased efficiency resulting in a low loaded amount of the homoleptic dinuclear palladium (II) complex compared to other palladium (II) catalysts.

8 Claims, 11 Drawing Sheets

HOMOLIPTIC DINUCLEAR COMPLEXES OF PALLADIUM (II) WITH DIAROYLDIHYDRAZONE SUCCINATE LIGAND AS HIGHLY EFFECTIVE CATALYST FOR CROSS COUPLING REACTIONS

BACKGROUND

1. FIELD

The disclosure of the present patent application relates to modified homogeneous dinuclear transition-metal-organic frameworks, such as a homoleptic dinuclear palladium (II) complex formed from a diisatin succinyldihydrazone ligand. Additionally, the present application involves economizing consumed catalysts for chemical transformation industrial processes with modified homogeneous dinuclear transition metal-organic frameworks.

2. DESCRIPTION OF THE RELATED ART

Cross coupling systems play an effective role in the development of various chemical industrial processes. Homogeneous catalysts of transition metal complexes are of great interest for synthesizing fine-chemical/specialty chemical/medical and pharmaceutical products for their high activity and modified chemo-, stereo- and regio-selectivity advantages within the widely used cross coupling reaction of C-C, C-O, C-N and C-S bonding. Such chemical transformations typically consume high energy for selective productivity.

Accordingly, designing novel and more effective homogeneous metal-organic complex catalysts is an essential demand in industrial fields. Hence, the catalytic reactivity of homogeneous metal-organic complex catalysts is influenced by the nature of both the central metal ion and the coordinated backbone ligands. The central metal ion's effect could be observed in its ability to approach the reacting components to achieve the catalytic processes to the selective productivity. The role of the donor centers of the coordinated backbone ligand could enhance the catalytic efficacy of the metal-organic framework catalysts.

Palladium is considered as one of the most reactive metal ion in its complex catalyst, as organopalladium compounds, in most cross coupling systems, e.g. Heck, Negishi, Suzuki-Miyaura, Buchwald-Hartwig, Cadiot-Chodkiewicz, Castro-Stephens, Corey-House, Kumada, Sonogashira, Stille and Ullmann reactions.

Accordingly, there remains a need for novel dipalladium-diaroyldihydrazone succinate complexes, as homoliptic dinuclear complexes and as an effective catalyst for some applicable cross coupling reactions. Therefore, metal-organic framework catalysts that enhance the catalytic effectiveness of the catalyst reaction by reducing the consumed time and temperature to room temperature with fewer hours required for the reaction are desired, as is a lower cost synthetic process of such a catalyst.

SUMMARY

The present subject matter relates to modified homogeneous dinuclear transition-metal-organic frameworks such as a homoleptic dinuclear palladium (II) complex from a novel diisatin succinyldihydrazone ligand. Additionally, the present subject matter involves economizing consumed catalysts for chemical transformation industrial processes with modified homogeneous dinuclear transition metal-organic frameworks, as well as a method of synthesizing a novel homogeneous catalyst with high catalytic efficiency, specifically in conducting catalytic cross-coupling reactions, such as by way of non-limiting example Suzuki-Miyaura C-C cross coupling reactions.

In one embodiment, the present subject matter may relate to the synthesis and characterization of a diisatin succinyldihydrazone ligand from succinyldihydrazide condensed with isatin. The novel ligand can be characterized using at least $^1$HNMR spectra and $^{13}$CNMR spectra of the ligand.

In an embodiment, the present subject matter may relate to the design, synthesis and characterization of a modified homogeneous dinuclear transition-metal-organic frameworks such as a homoleptic dinuclear palladium (II) complex, which is synthesized from the diisatin succinyldihydrazone ligand blended with $PdCl_2$ (palladium chloride). The novel catalyst is characterized using IR, UV-Vis, mass spectra, and elemental analysis and magnetism.

In this regard, an embodiment of the present subject matter relates to a diisatin succinyldihydrazone ligand having the following structure

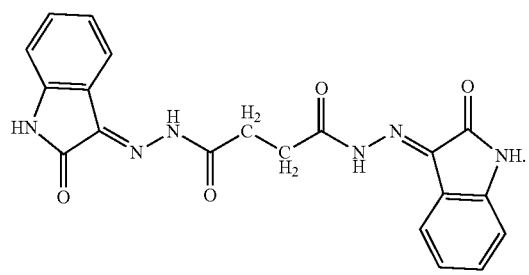 [SMILES: O=C(CCC(=O)N/N=C1/C(=O)Nc2ccccc21)N/N=C1/C(=O)Nc2ccccc21]

In another embodiment, the present subject matter relates to a method of making the diisatin succinyldihydrazone ligand, the method comprising condensing succinyl dihydrazide with isatin to form the diisatin succinyldihydrazone ligand.

In a further embodiment, the present subject matter relates to a homoleptic dinuclear palladium (II) complex, said complex having the following structure:

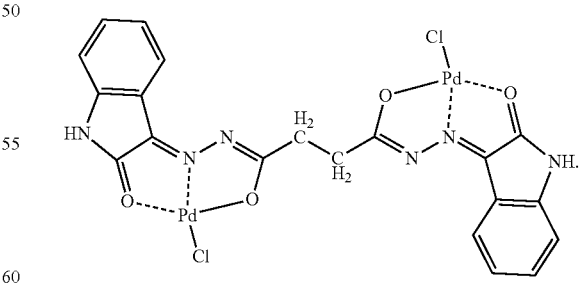

In another embodiment, the present subject matter relates to a method of making the homoleptic dinuclear palladium (II) complex, the method comprising mixing a diisatin succinyldihydrazone ligand having the following structure

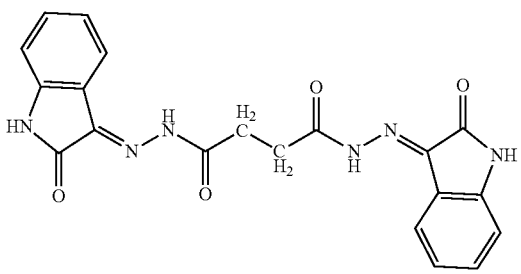 [SMILES: O=C(CCC(=O)N/N=C1/C(=O)Nc2ccccc21)N/N=C1/C(=O)Nc2ccccc21]

with PdCl$_2$ (palladium chloride) in methanol to form the homoleptic dinuclear palladium (II) complex by the following reaction scheme:

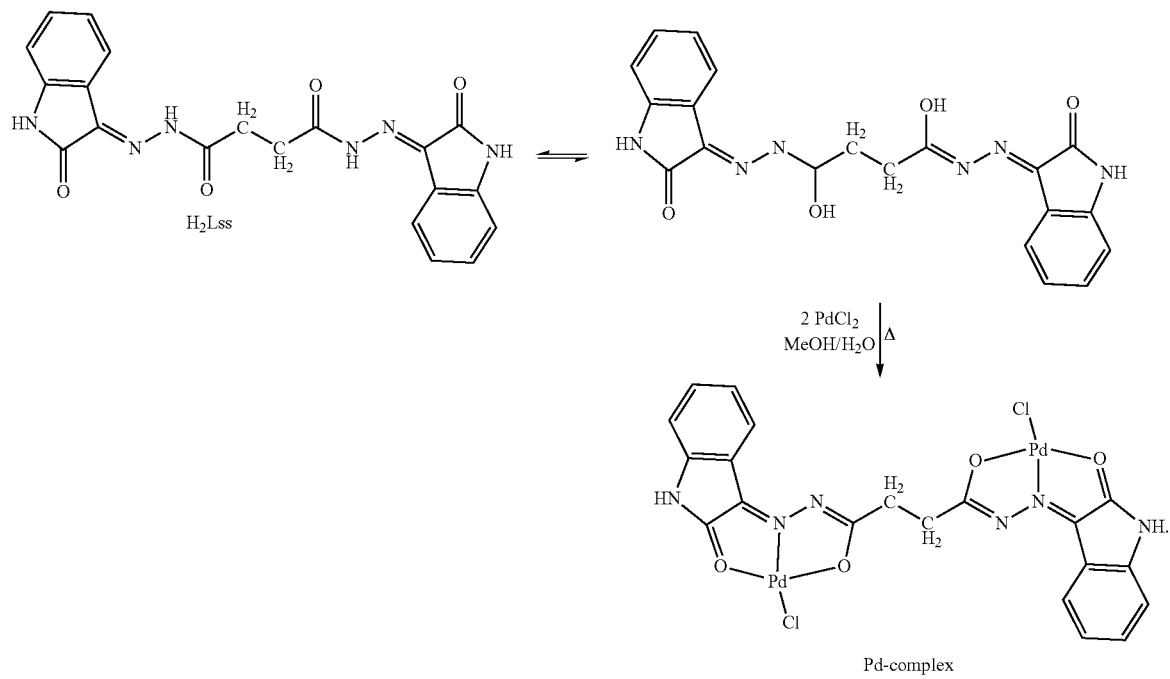

In yet another embodiment, the present subject matter relates to a method for conducting a Suzuki-Miyaura C-C cross coupling reaction, the method comprising: contacting the homoleptic dinuclear palladium (II) complex catalyst with 2-bromopyridine and phenylboronic acid in the presence of potassium bicarbonate; and obtaining a C-C diaryl product.

These and other features of the present subject matter will become readily apparent upon further review of the following specification.

DETAILED DESCRIPTION OF THE PREFERRED EMBODIMENTS

Figure 1A:
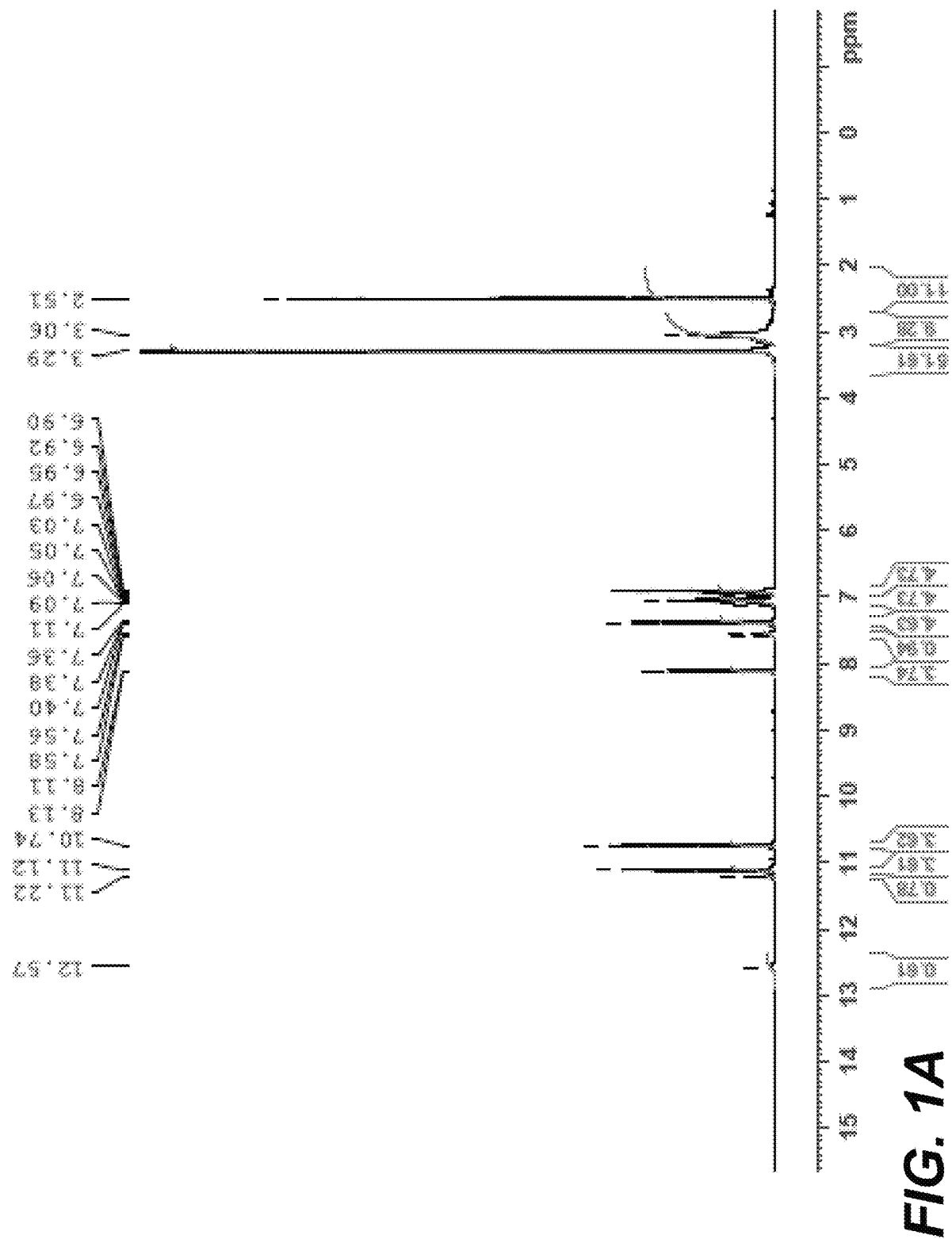
FIG. 1A is an $^1$HNMR spectra of the diisatin succinyldihydrazone ligand in DMSO-d6 at 25° C.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to modified homogeneous dinuclear transition-metal-organic frameworks such as a di-palladium (II) diaroyldihydrazone succinate complex formed from a novel diisatin succinyldihydrazone ligand. Additionally, the present subject matter relates to economizing consumed catalysts for chemical transformation industrial processes with said modified homogeneous dinuclear transition metal-organic frameworks, as well as a method of synthesizing a novel homogeneous catalyst with high catalytic efficiency, including in catalytic cross-coupling reactions, such as, by way of non-limiting example, the cross-coupling of 2-bromopyridine with phenylboronic acid.

According to the present subject matter, the role of the donor centers of the coordinated backbone ligand may enhance the catalytic efficacy of the metal-organic framework catalysts. Use of dinuclear central metal ions instead of a mononuclear central metal ion in the metal-organic framework catalysts may enhance the catalytic effectiveness of the catalyst by reducing the consumed time to a few hours and the temperature to room temperature.

Regarding modified homogeneous dinuclear transition-metal-organic frameworks such as a di-palladium (II) diaroyldihydrazone succinate complex from a novel diisatin succinyldihydrazone ligand, the role of the donor centers of the coordinated backbone ligand may enhance the catalytic efficacy of the metal-organic framework catalysts. Use of dinuclear central metal ions instead of a mononuclear central metal ion in the metal-organic framework catalysts may enhance the catalytic effectiveness of the catalyst by reducing the consumed time to a few hours and the temperature to room temperature.

In one embodiment, the present subject matter may relate to the synthesis and characterization of a diisatin succinyldihydrazone ligand from succinyldihydrazide condensed with isatin. The novel ligand can be characterized using $^1$HNMR spectra and $^{13}$CNMR spectra of the ligand.

Synthesis of diisatin succinyldihydrazone ligand

In this regard, an embodiment of the present subject matter relates to a diisatin succinyldihydrazone ligand having the following structure

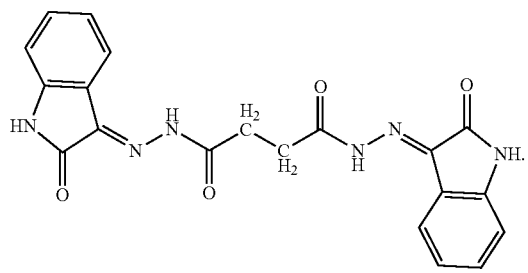 [SMILES: O=C(CCC(=O)N/N=C1/C(=O)Nc2ccccc21)N/N=C1/C(=O)Nc2ccccc21]

In an embodiment, this ligand is effective for enhancing catalytic effectiveness of a VO complex catalyst reaction by reducing consumed time and temperature when said ligand is combined with, e.g., vanadyl acetylacetonate.

In another embodiment, the present subject matter relates to a method of making the diisatin succinyldihydrazone ligand, the method comprising condensing succinyl dihydrazide with isatin to form the diisatin succinyldihydrazone ligand according to Scheme 1:

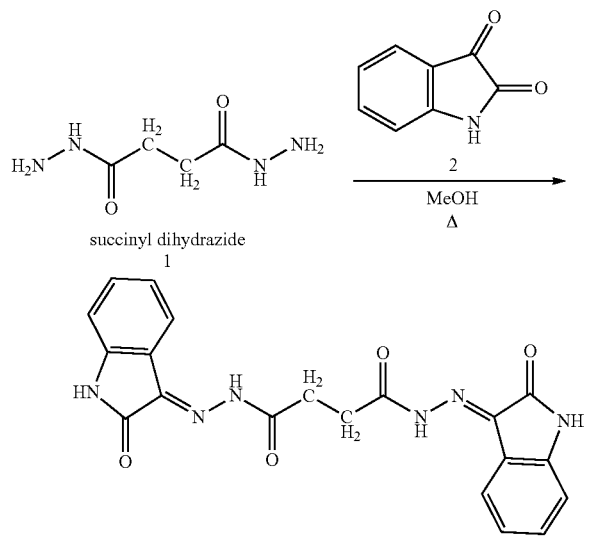

Scheme 1. Synthetic pathway of the novel ligand from succinyl dihydrazide

In certain embodiments in this regard, the succinyl dihydrazide is condensed with isatin in the presence of methanol. In additional embodiments, the production method can further comprise condensing the succinyl dihydrazide in methanol with the isatin in methanol by mixing to form a methanolic mixture, and refluxing the methanolic mixture with stirring for about 4 hours at about 80° C. In other embodiments, the refluxing and stirring can occur for at least about 4 hours, for about 3 to about 5 hours, or for any time amount therein. In certain other embodiments, the refluxing and stirring can occur at a temperature of at least about 80° C., at about 70° C. to about 90° C., or at any temperature therein. In a further embodiment, the production method can further comprise removing the methanol from the methanolic mixture by filtration and recrystallizing a solid precipitate in methanol to produce a yellow powder of the diisatin succinyldihydrazone ligand.

Synthesis of di-palladium (II) diaroyldihydrazone succinate complex

In an embodiment, the present subject matter may relate to the design, synthesis and characterization of a modified homogeneous dinuclear transition-metal-organic framework such as a novel di-palladium (II) diaroyldihydrazone succinate complex, which is synthesized from the diisatin succinyldihydrazone ligand blended with PdCl$_2$ (palladium chloride). The novel catalyst is characterized using IR, UV-Vis, mass spectra, and elemental analysis and magnetism.

In this regard, an embodiment of the present subject matter relates to a di-palladium (II) diaroyldihydrazone succinate complex, said complex having the following structure:

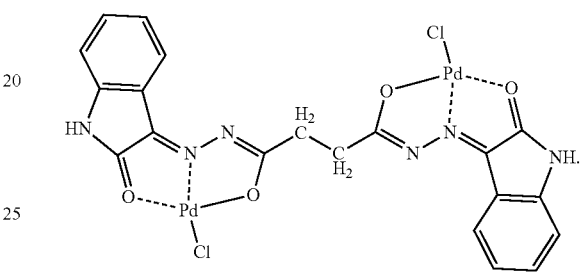

In another embodiment, the present subject matter relates to a method of making the di-palladium (II) diaroyldihydrazone succinate complex, the method comprising mixing a diisatin succinyldihydrazone ligand having the following structure

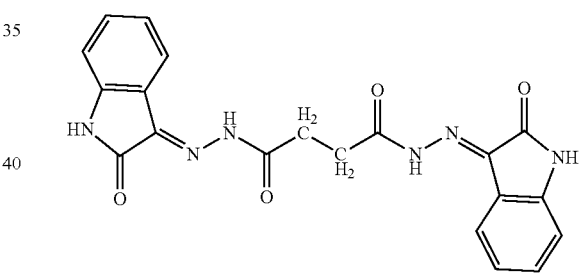

with PdCl$_2$ (palladium chloride) in methanol to form the di-palladium (II) diaroyldihydrazone succinate complex by the following reaction Scheme 2:

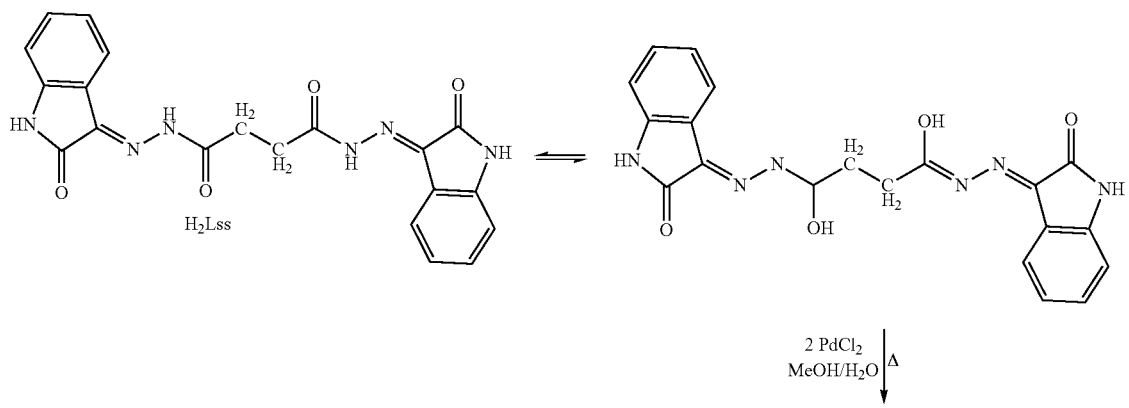

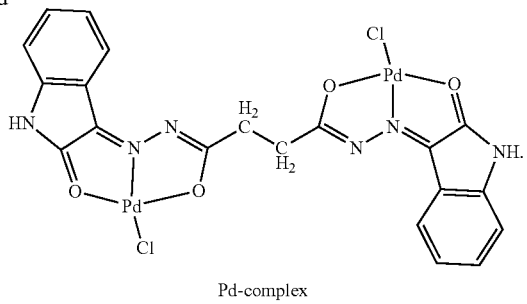

Pd-complex

Scheme 2. Metal to ligand coordination from complexation of the ligand to $Pd^{2+}$ion in methanolic-aqueous mixed media..

In certain embodiments in this regard, the method can further comprise extracting MeOH from the complexing reaction mixture by a reduced pressure to produce a solid complex, and aggregating the solid complex by washing with diethyl ether to produce an aggregated solid complex. In other embodiments, the method can further comprise recrystallizing the aggregated solid complex in methanol to obtain the homoleptic dinuclear palladium (II) complex. In certain embodiments, the homoleptic dinuclear palladium (II) complex has an about 1:2 molar amount of the diisatin succinyldihydrazone ligand to $Pd^{2+}$ions. In further embodiments, the method provides an about 73% yield of the homoleptic dinuclear palladium (II) complex.

Methods of Catalytic Cross-coupling

In an embodiment, the present subject matter may relate to economizing consumed catalysts for chemical transformation industrial processes with modified homogeneous dinuclear transition metal-organic frameworks having high catalytic efficiency.

Accordingly, in another embodiment, the present subject matter relates to a method for conducting a Suzuki-Miyaura C-C cross coupling reaction, the method comprising: contacting the homoleptic dinuclear palladium (II) complex catalyst with 2-bromopyridine and phenylboronic acid in the presence of potassium bicarbonate; and obtaining a C-C diaryl product. In certain non-limiting embodiments, the C-C diaryl product is 2-phenylpyride, wherein an about 95% yield of the 2-phenylpyridine is obtained. In certain other non-limiting embodiments, a reduced amount of the homoleptic dinuclear palladium (II) complex catalyst is required compared to other catalysts of palladium (II), and which can result in high yields of the selected product in a short time, for example, about 3 hours.

EXAMPLES

Example 1: Production of the diisatin succinyldihydrazone ligand

From Sigma-Aldrich and Merck, all the necessary initial materials and precursors were employed without any re-handling assigned. 0.73 g of succinyl dihydrazide (1) (5 mmol in 30 mL of methanol (MeOH)) was condensed with 1.47 g of isatin (10 mmol) in 50 mL methanol by a leisure mixing. The acquired methanolic mixture was refluxed with stirring for 4 hours (at 80° C.). The reaction progress was followed by TLC. The organic solvent was removed by filtration. The solid precipitate was recrystallized in MeOH to afford pure yellow powder of diisatin succinyldihydrazone ligand, yielding almost 1.64 g (81%).

Evaluation of the nuclear magnetic resonances' spectra (hydrogen and carbon nuclei) in DMSO-d6 at 25° C. for the ligand was achieved using Bruker FT-NMR multinuclear spectrometric device (model of ARX400). The magnetic fields for carbon nuclei and hydrogen protons were 100.6 and 400.1 MHz, respectively.

$^1$HNMR spectra of the diisatin succinyldihydrazone ligand (for the diketonic form): 3.06 (s, 4H, $C_2H_4$), 6.91 (d, $^3J$=7.2 Hz, 2H), 7.05 (t, $^4J$=2.0 and $^3J$=7.0 Hz, 2H), 7.38 (t, $^3J$=7.3 Hz, 2H), 8.12 (d, $^3J$=7.0 Hz, 2H), 10.74 (s, 2H, NH) and 11.12 ppm (s, 2H, NH) (FIG. 1A); (for the dienolic form): 6.96 (d, $^3J$=7.1 Hz), 7.09 (t, $^4J$=1.9 and $^3J$=7.0 Hz), 7.57 (d, $^3J$=6.9 Hz), 11.22 (s, OH) and 12.57 ppm (s, NH).

Figure 1B:
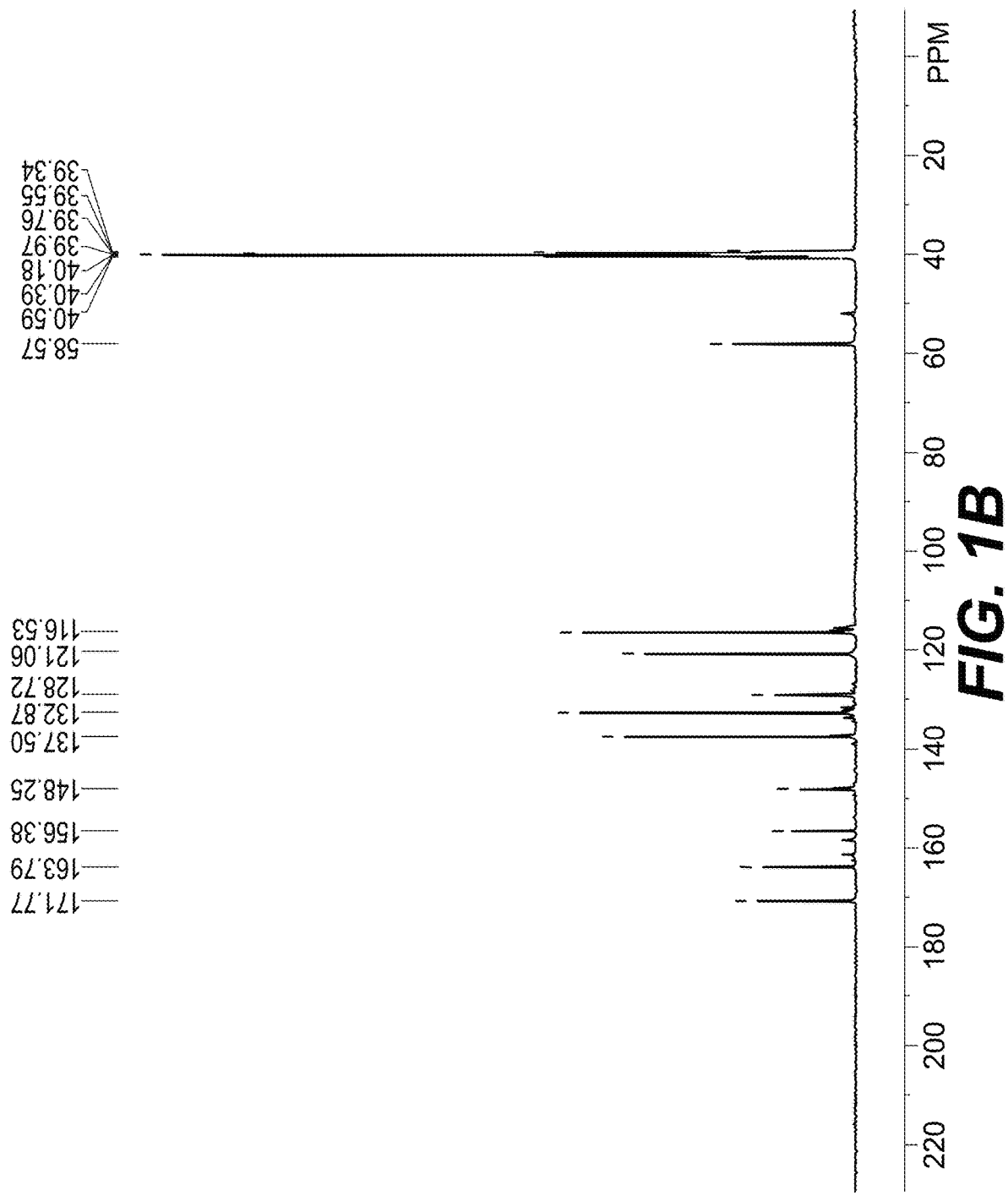
FIG. 1B is a $^{13}$CNMR spectra of the diisatin succinyldihydrazone ligand in DMSO-d6 at 25° C.

$^{13}$CNMR spectra of the diisatin succinyldihydrazone ligand: 58.57 ($CH_2$), 116.53 (CH), 121.06 (CH), 128.72 ($C_q$), 132.87 (CH), 137.50 (CH), 148.25 ($C_q$), 156.38 ($C_q$), 163.79 (CH, CH=N) and 191.77 ppm ($C_q$, C=O) (FIG. 1B).

Figure 3:
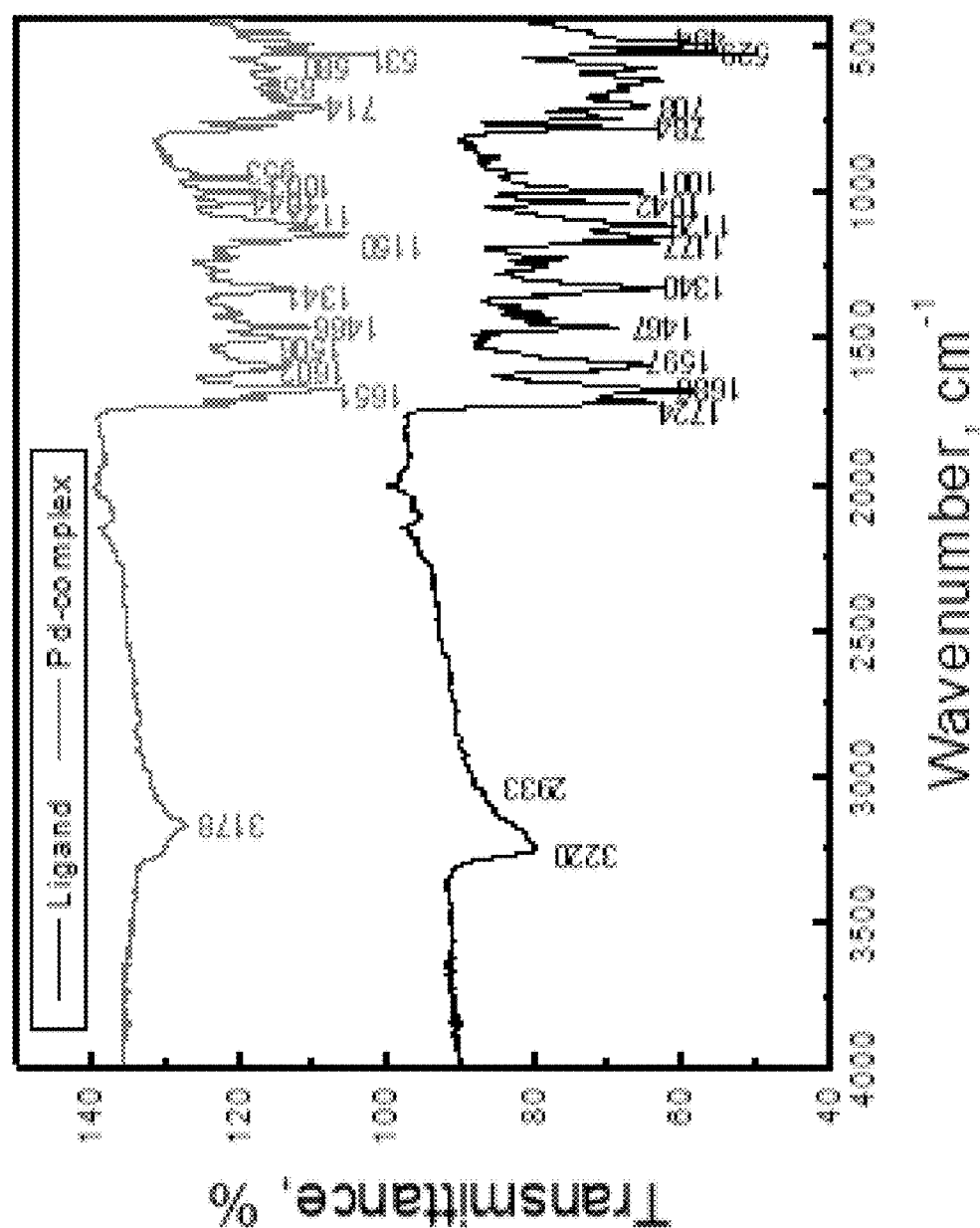
FIG. 3 shows comparable FT-IR spectral scans for the solid phase of the homoliptic dinuclear palladium (II) diaroyldihydrazone succinate complex catalyst and its corresponded diisatin succinyldihydrazone ligand at 25° C.

FTIR spectra of the free ligand: 3220 (NH), 1724 (C=O), 1686 (C=O) and 1597 $cm^{-1}$ (C=N) (FIG. 3).

Example 2: Production of the homoliptic dinuclear palladium (II) diaroyldihydrazone succinate complex catalyst 2.0 mmol of diisatin succinyldihydrazone ligand (0.81 g) in methanol (40 mL) was poured leisurely to 4.0 mmol of $PdCl_2$ (palladium chloride, 0.71 g) in 50 mL MeOH. The complexing reaction took place by stirring and refluxing the reaction mixture for 3-4 h (at 80-85° C.). TLC technique was applied to monitor the accomplishment of the reaction. Finally, after the completion, MeOH was extracted by a reduced pressure. The acquired solid complex was aggregated with careful washing with diethyl ether several times. A processing of recrystallization was achieved in MeOH to obtain a clear, colored complex. The yielded amount of the dipalladium (II) complex catalyst was 1.01 g with 73%. The decomposition point was 274° C.

Figure 2A:
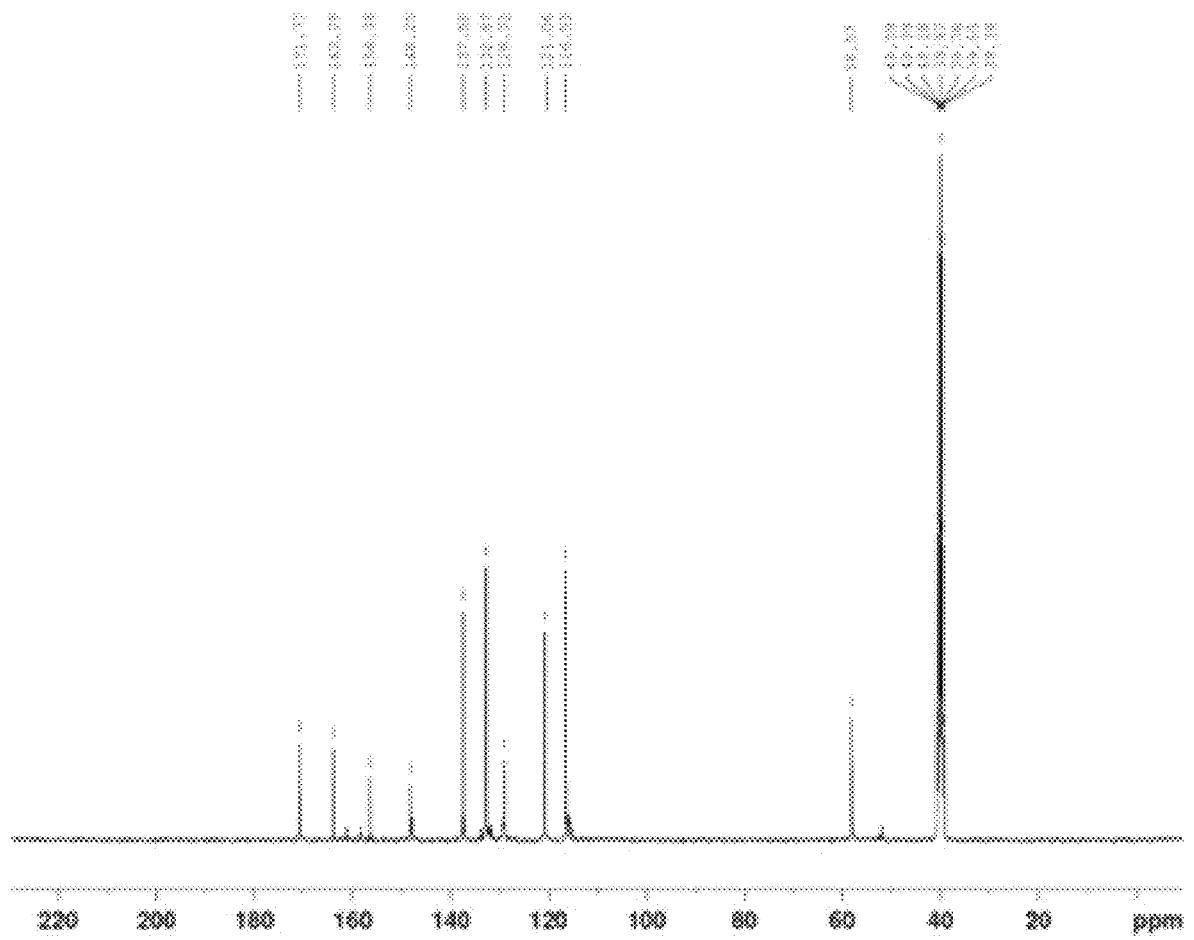
FIG. 2A is an $^1$HNMR spectra of the homoliptic dinuclear palladium (II) diaroyldihydrazone succinate complex catalyst in DMSO-d$_6$ at 25° C.

$^1$HNMR spectra of the homoliptic dinuclear palladium (II) diaroyldihydrazone succinate complex catalyst: 4.52 (s, 4H), 7.46 and 7.50 (s, 2H), 8.39 (d, $^3J$=7.2 Hz, 2H), 8.64 (s, 2H) and 12.61 ppm (s, NH, 2H) (FIG. 2A).

Figure 2B:
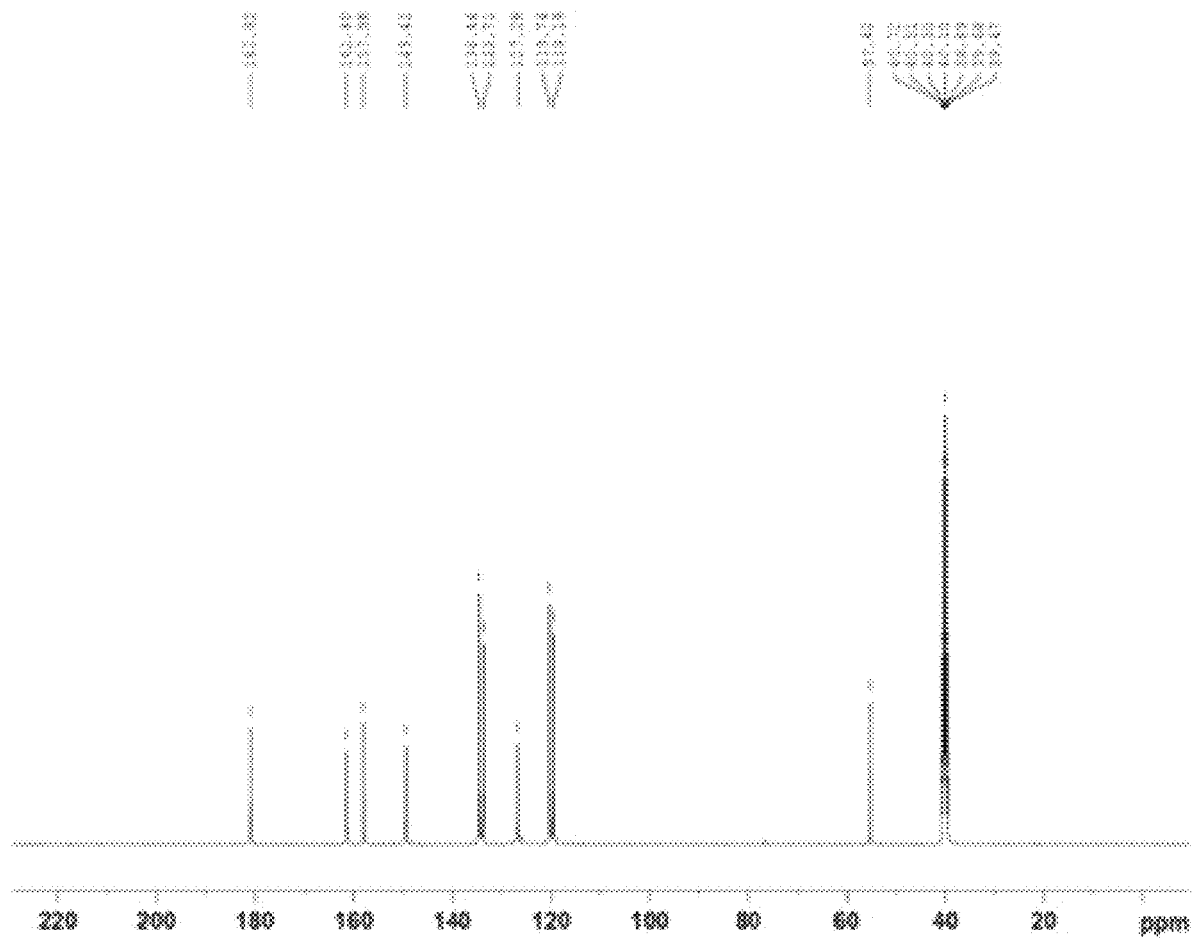
FIG. 2B is a $^{13}$CNMR spectra of homoliptic dinuclear palladium (II) diaroyldihydrazone succinate complex catalyst in DMSO-d$_6$ at 25° C.

$^{13}$CNMR spectra of the homoliptic dinuclear palladium (II) diaroyldihydrazone succinate complex catalyst: 57.42 ($CH_2$), 119.19 (CH), 119.74 (CH), 127.28 ($C_q$), 133.71 (CH), 134.44 (CH), 149.41 ($C_q$), 157.98 ($C_q$, C=N), 161.40 ($C_q$, C=N) and 164.92 ppm ($C_q$, C=O) (FIG. 2B).

FTIR spectra of the homoliptic dinuclear palladium (II) diaroyldihydrazone succinate complex catalyst: 3178 (NH), 1651 (C=O), 1506 (C=N), 1466 (C=N), 741 (Pd-Cl), 658 (Pd-O), 580 (Pd-O) and 531 cm$^{-1}$ (Pd-N) (FIG. 3).

Example 3: Structural confirmations

Confirming the diisatin succinyldihydrazone ligand and its corresponding palladium (II) complex chemical structures was conducted by analyses of mass, ultraviolet-visible, and infrared spectral studies. Also, the CHN analyses (i.e., EA, elemental analyses), conductance characteristics, and magnetic features were studied and are shown in Table 1.

TABLE 1

| Comp. (M.W.) | Color | CHN analyses, % | | | Electronic spectra | | | $\Lambda_m$, $\Omega^{-1}$ cm$^2$ mol$^{-1}$ | |
|---|---|---|---|---|---|---|---|---|---|
| | | C | H | N | $\lambda_{max}$, nm | $\varepsilon$, mol$^{-1} \cdot$ cm$^{-1}$ | Assign. | DMSO | DMF |
| H$_2$LC$_2$ (404.39 g · mol$^{-1}$) | Yellow | 59.81 (59.90) | 4.31 (3.99) | 20.56 (20.78) | 262 338 | 13285 5179 | $\pi \to \pi^*$/n $\to \pi^*$ LCT | 27 | 33 |
| PdLC$_2$ (686.11 g · mol$^{-1}$) | Brown | 35.41 (35.01) | 2.37 (2.06) | 12.00 (12.25) | 251 309 359 | 9908 6811 3895 | $\pi \to \pi^*$ n $\to \pi^*$ L-MCT | 31 | 44 |

Table 1 shows the main elements percentage analyses (CHN, %) of the ligand and di-Pd(II)-complex. The ultraviolet-visible spectra of all compounds in DMF (1.0×10$^{-5}$ mol.dm$^{-3}$) and the conductivity measurements ($\Lambda_m$, $\Omega^{-1}$.cm$^2$.mol$^{-1}$) are in DMSO and DMF (1.0×10$^{-3}$ mol.dm$^{-3}$) at ambient temperature.

Figure 4:
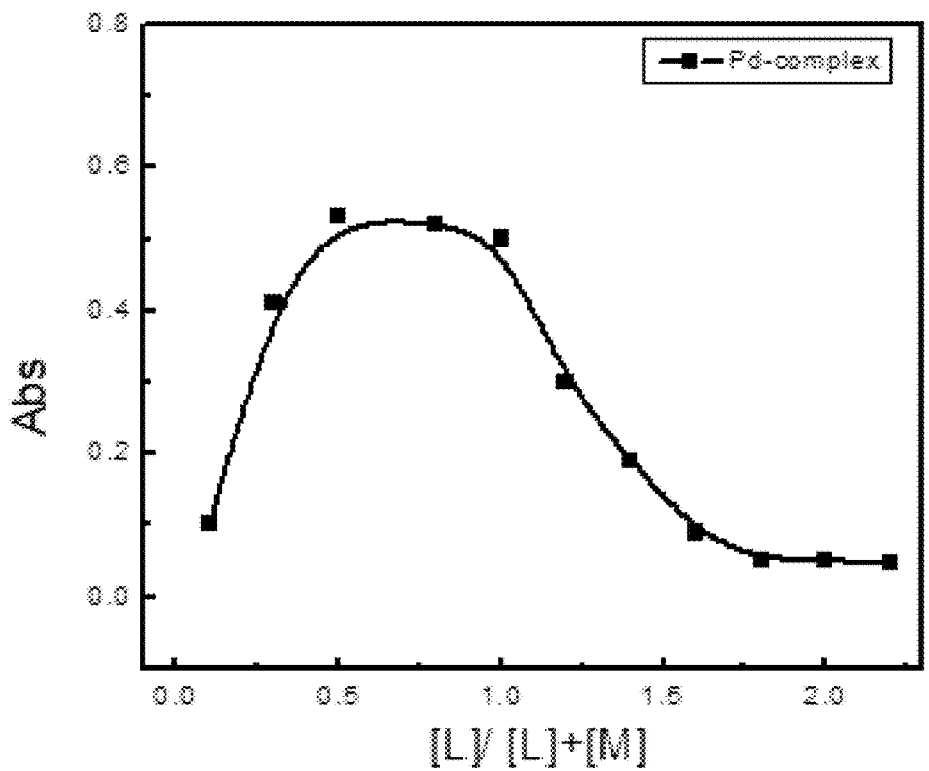
FIG. 4 is a continuous variation plot of the stoichiometric molar ratios for di-palladium (II) diaroyldihydrazone succinate complex complexation formed with the diisatin succinyldihydrazone Ligand in DMF media at $[L]=[M^{2+}]=1\times10^{-5}$ mol dm$^{-3}$ at 25° C.

The main elements analyses of CHN are aimed at determining the purity form of all current compounds, which are listed in Table 1. The considered percentages of the main elements analyses are harmonic with the planned ones with less than 0.4% difference for the diisatin succinyldihydrazone ligand and its di-palladium (II) diaroyldihydrazone succinate complex catalyst. Notably, the high-purity form of such results could be deduced with a confirmation of their chemical structures (Scheme 1). The melting point for the diisatin succinyldihydrazone ligand and the decomposition degree for the di-palladium complex catalyst are 221 and 274° C., respectively, attributing to their high stability with a distinguished variation in that point between the free ligand and its di-palladium (II) diaroyldihydrazone succinate complex. Such observation is displayed for the complexing influence of the high stability of di-palladium (II) diaroyldihydrazone succinate complex compared to its ligand. The stoichiometric ratios of the diisatin succinyldihydrazone ligand to the coordinated Pd$^{2+}$ions are tested in DMF through the spectrometric continuous variation method. From FIG. 4, the coordination features of the diisatin succinyldihydrazone ligand to Pd$^{2+}$ions are found in 1:2 molar amounts, respectively (Scheme 2).

Figure 5:
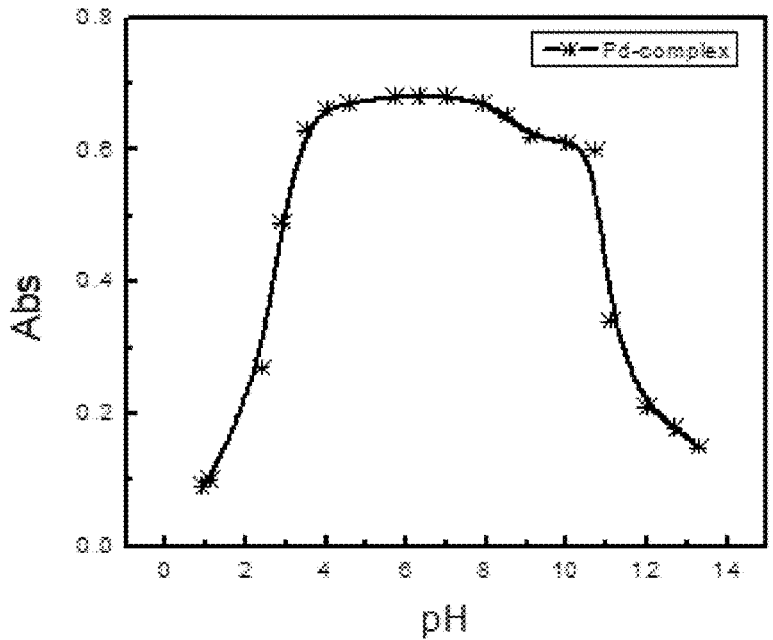
FIG. 5 is a plot showing pH affect stability of a DMF solution of the di-palladium (II) diaroyldihydrazone succinate complex.

Moreover, the stability of the di-palladium (II) diaroyldihydrazone succinate complex at a wide range of pH values was investigated spectroscopically within the standard universal buffer solutions. The di-palladium (II) diaroyldihydrazone succinate complex elucidated an illustrated stability area from a pH of 3.1 to 10.9 (FIG. 5).

Particularly, the diisatin succinyldihydrazone ligand and its di-palladium (II) diaroyldihydrazone succinate complex were remarkably soluble in the organic solvents with high coordinating characteristics, e.g., N,N'-dimethylformamide (DMF) and dimethylsulfoxide (DMSO). The di-palladium (II) diaroyldihydrazone succinate complex showed a hard dissolution in polar organic solvents, i.e., slight solubility, in acetonitrile, ethanol, acetone and methanol. The noted minimal solubility of VO-diisatin succinyldihydrazone complex was attributed to its low conductivity measurements, as given in Table 1, in DMF and DMSO. Such behavior could be considered for the covalent nature of the di-palladium (II) diaroyldihydrazone succinate complex.

NMR spectra

The deuterated solutions of the diisatin succinyldihydrazone ligand in DMSO-d6 at the ambient temperature, the NMR spectra (nuclear magnetic resonance spectroscopy) for the 1-hydrogen and 13-carbon nuclei in the free diisatin succinyldihydrazone ligand were examined and are given in FIGS. 1A and 1B. The succinyl group's four protons are located at 3.06 ppm in the ligand. The two NH protons of the dihydazone and diisatin moieties in the ligand are found at 11.12 and 10.74 ppm (as broad signal in the diketo form) (Scheme 1), in which the NH signal of the hydrazone moiety is completely disappeared after its reaction with the Pd$^{2+}$ion. The dienolic tautomer is formed by the presence of the Pd$^{2+}$ion to coordinate within the O,N,O-donor centers in the di-palladium (II) diaroyldihydrazone succinate complex (Scheme 2). The other spectral signals for the ligand belonged to the two aryl rings of the two isatin moieties, which have no observable shifts after the complexation of its ligand (FIG. 1A). The dienolic tautomer could be observed by NMR spectra as a minor form.

The NH proton of the diisatin moieties slightly shifted after the complexation to Pd$^{2+}$ion in di-palladium (II) complex to present at 12.61 ppm (FIG. 1B). After its sharing in the coordination to Pd$^{2+}$ions, the anionic form within deprotonation of the hydroxy tautomer of the dihydrazone moieties (Scheme 2) shared in the complexation (FIGS. 2A,B). The other spectral signals for the free ligand and di-palladium (II) complex belong to the two aryl rings of the two isatin moieties, which have no observable shifts after the complexation of its ligand (FIGS. 1A,B).

The HNMR spectra for the ligand solution (in FIG. 1A) represented small absorption signals beside the main reported ones in the experimental section, which referred to the dienolic tautomer of the ligand. At 12.57 ppm, a small signal was observed which assigned for the NH proton of the isatin moiety. The OH proton of the dienolic tautomer could be distinguished at 11.22 ppm. Moreover, the other aryl protons showed spectral signals at 6.96, 7.09 and 7.57 ppm.

For the absorption spectra of carbon nuclei for the free ligand, the two carbonyl groups (C=O) of the hydrazone chain show their carbon spectral signal at 171.77 ppm (FIG. 2A) in the diketo form, which is not observed after the bonding to Pd$^{2+}$ion (FIG. 2B). Hence, the complexation of the ligand was carried out within its dienolic tautomer. Instead, new spectral signal was distinguished as C=N of the dienolic tautomer of the coordinated ligand in di-palladium (II) complex, which was located at 164.92 ppm (FIG. 2B).

The carbon spectral signal of C=N of the free ligand was detected at 163.79 ppm, which obviously shifted to be distinguished at 182.92 ppm for di-palladium (II) complex, based on the participation of nitrogen lone pair to $Pd^{2+}$cation in its coordination sphere. Additionally, in the aliphatic area of the $^{13}$CNMR spectra, the carbon signals of the succinyl chain were located at 58.57 and 57.42 ppm for the free ligand and the di-palladium (II) diaroyldihydrazone succinate complex, respectively, interpreting less influence of the $Pd^{2+}$ion on that group due to its complexation.

Additionally, in the aliphatic area of the $^{13}$CNMR spectra, the carbon signal of the succinyl chain was located at 58.57 ppm for the ligand. The tautomeric form of the dienolic structure could be distinguished clearly by $^{13}$CNMR spectra (FIG. 1B) by small spectral signals. At 162.34, 158.79, 133.90, 131.54, 115.68 and 52.88 ppm, the dienolic structure of the free ligand could be confirmed.

Infrared spectral studies

The samples of the free ligand and di-palladium (II) diaroyldihydrazone succinate complex were measured for the IR spectra, and the considered spectral bands are illustrated in FIG. 3. The resonating bands of two identical NH bonds of the diistain and hydrazone (the amido group) moieties and the phenolic group appeared at 3220 $cm^{-1}$, as a broad band. The ligand is found in its diketo form, as the most stable form, as shown in Scheme 1. The two NH stretching bands for the diisatin moieties shifted slightly after bonding to $Pd^{2+}$ion to be located at 3178 $cm^{-1}$, in the di-palladium (II) diaroyldihydrazone succinate complex (Scheme 2).

The obvious sharp band for the two C=O bands of the two isatin moieties, which were obtained at 1686 $cm^{-1}$ in the free ligand, are displayed at 1651 $cm^{-1}$ in the di-palladium (II) complex, respectively. That distinguished shift due to the presence of $Pd^{2+}$ions could be considerably assigned to their participation within the oxygen lone pair of C=O for coordination to the metal ion.

For the diketo form, the two carbonyl groups are located at 1742 $cm^{-1}$, which are not found after the complexation of their ligand, as observed for the reported analogues. On the other side, two new imino groups (>C=N–) appeared in the complexes at 1506 $cm^{-1}$, for di-palladium (II) complex, respectively. Such behavior could prove the coordination of the deprotonated hydroxyl group of the dienolic structure of the ligand. Furthermore, the sharp band of the two –C=N– groups are observed at 1597 $cm^{-1}$, which shifted to lower wave number values after its coordination to $Pd^{2+}$ion within an N-lone pair to be detected at 1466 $cm^{-1}$, for di-palladium (II) diaroyldihydrazone succinate complex, respectively. New remarked bands are noted at low wave number scale for di-palladium (II) diaroyldihydrazone succinate complex (741, 658, 580 and 531 $cm^{-1}$) referring to the stretching vibration of Pd-Cl, Pd-O, Pd-O and Pd-N bonds, respectively (Scheme 2).

UV and vis. spectra

Figure 6:
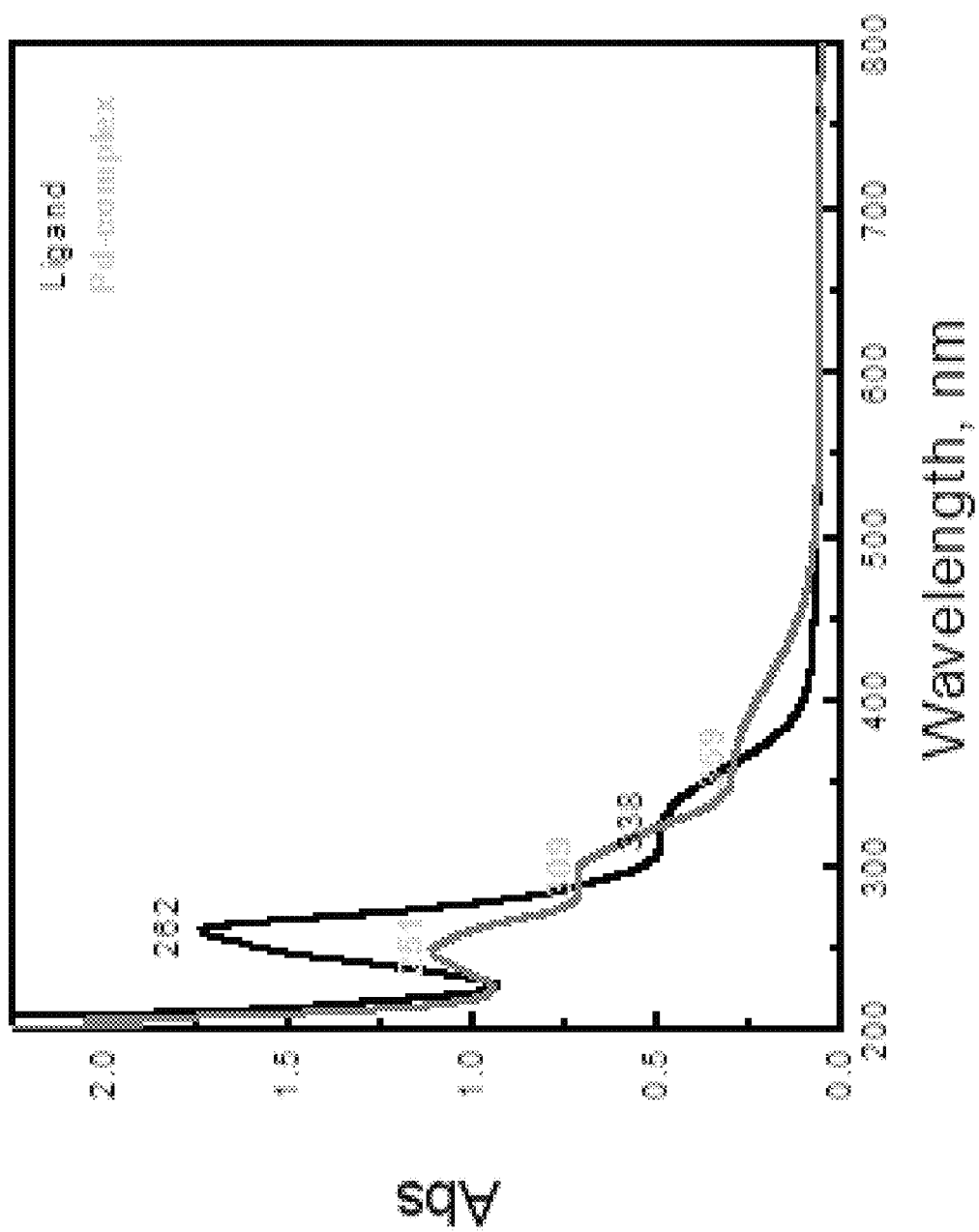
FIG. 6 shows, at 25° C. and in DMF, the ultraviolet and visible spectra for $1.0\times10^{-6}$ mol.dm$^{-3}$ for the diisatin succinyldihydrazone ligand and the di-palladium (II) diaroyldihydrazone succinate complex.

The DMF solutions of the ligand and its di-palladium (II) diaroyldihydrazone succinate complex represent the obvious electronic transitions with absorption bands at the maximum wavelength λmax and the derived molar absorptivity (Table 1 and FIG. 6). The observed π→π* and n→π* electronic transitions are distinguished at 262 nm (for the free ligand), and at 251 and 309 nm (for the di-palladium (II) diaroyldihydrazone succinate complex), respectively, in the uncolored area. The current absorption bands are displayed for the electronic transition of the aryl rings π-bonds, >C=O, —C=N—and—NH lone pairs. The charge transfer spectral absorption is located at 338 nm (ligand, referring to the change transfer in the ligand molecule), and 359 nm (for the di-palladium (II) diaroyldihydrazone succinate complex), respectively, referring to the electron density transfer form $Pd^{2+}$ion to the π-orbitals of the coordinated ligand as a charge transfer, in the visible area.

Mass spectra

Figure 7A:
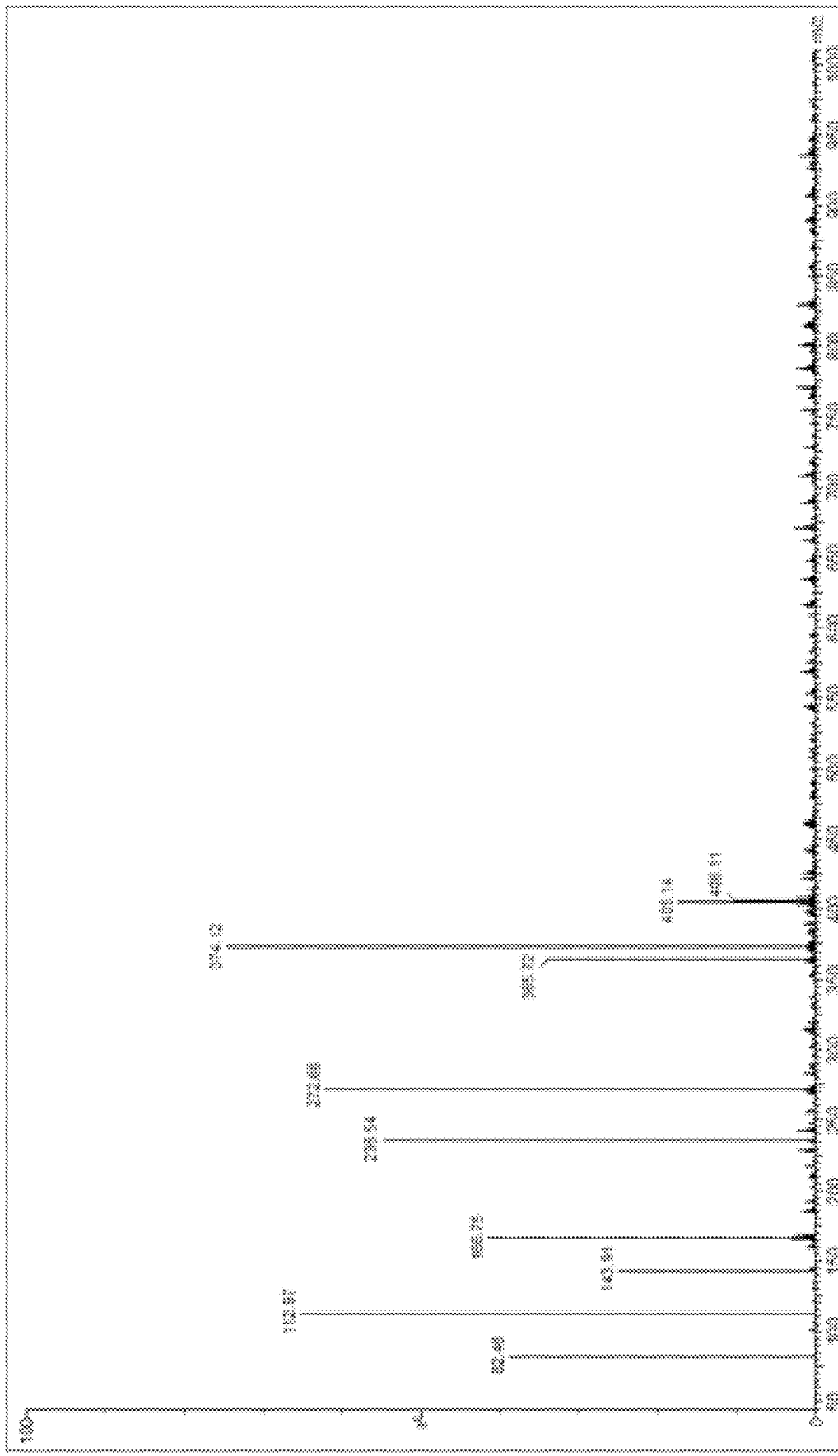
FIG. 7A shows EI-Mass spectra of the diisatin succinyldihydrazone ligand in DMF media at 25° C.
Figure 7B:
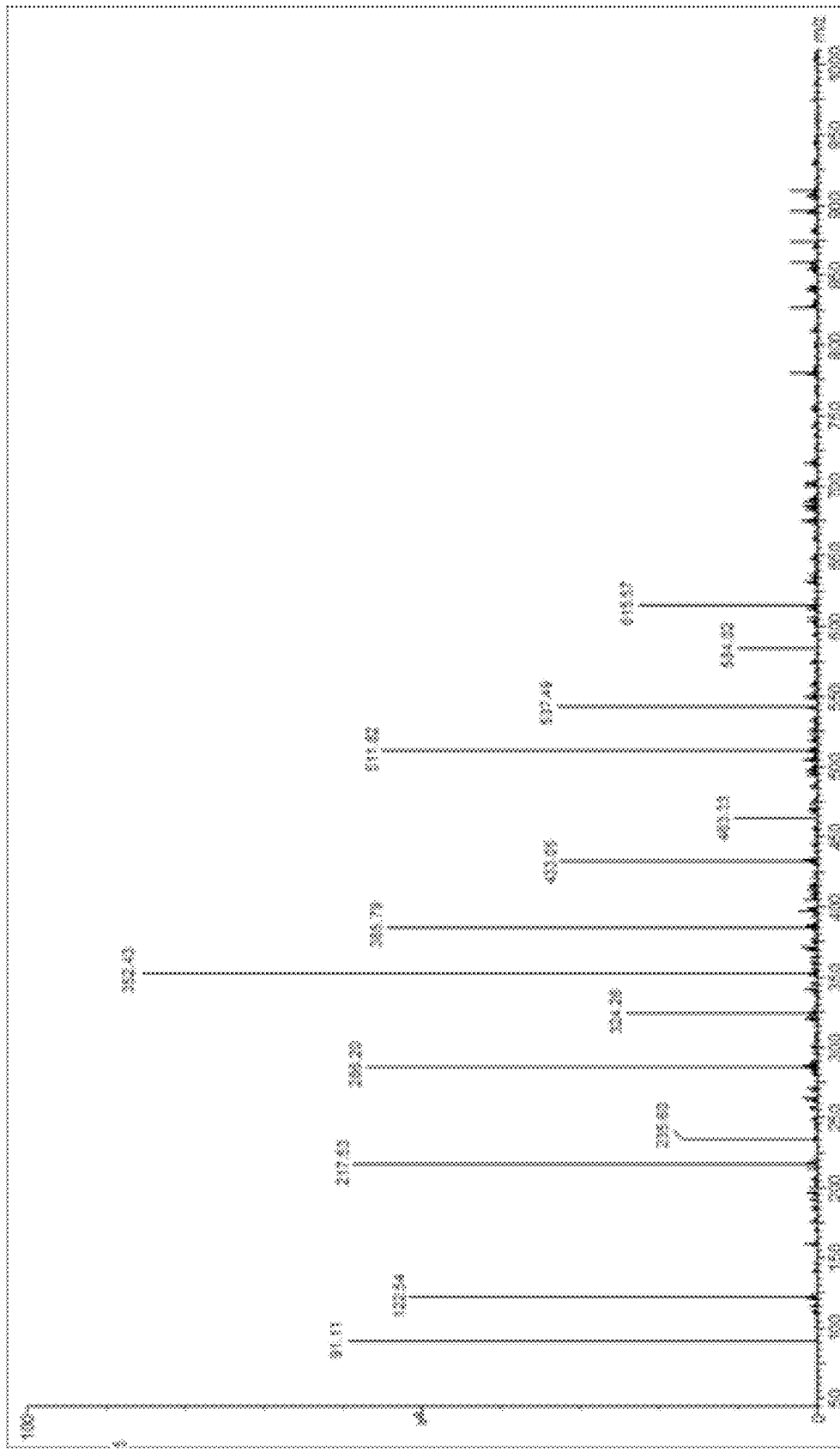
FIG. 7B shows EI-Mass spectra of the di-palladium (II) diaroyldihydrazone succinate complex in DMF media at 25° C.

ELMS spectral scans with positive modes of analyses for the solutions of the ligand and di-palladium (II) diaroyldihydrazone succinate complex were instigated and are represented in FIGS. 7A,B. The free ligand shows base peaks for the positive mode at 405.14 and 406.11 m/z for mass fraction of [HL+1], 374.12, 272.66, 166.75, 112.97 and 82.46 m/z (FIG. 7A). The EI-MS analyses for the solution of di-palladium (II) diaroyldihydrazone succinate complex are observed at 615.57 m/z for [ML-2Cl$^-$], and at 511.82, 463.33, 433.05, 324.26 and 122.54 m/z (FIG. 7B).

Example 4—Quantum Chemical Calculations

Figure 8:
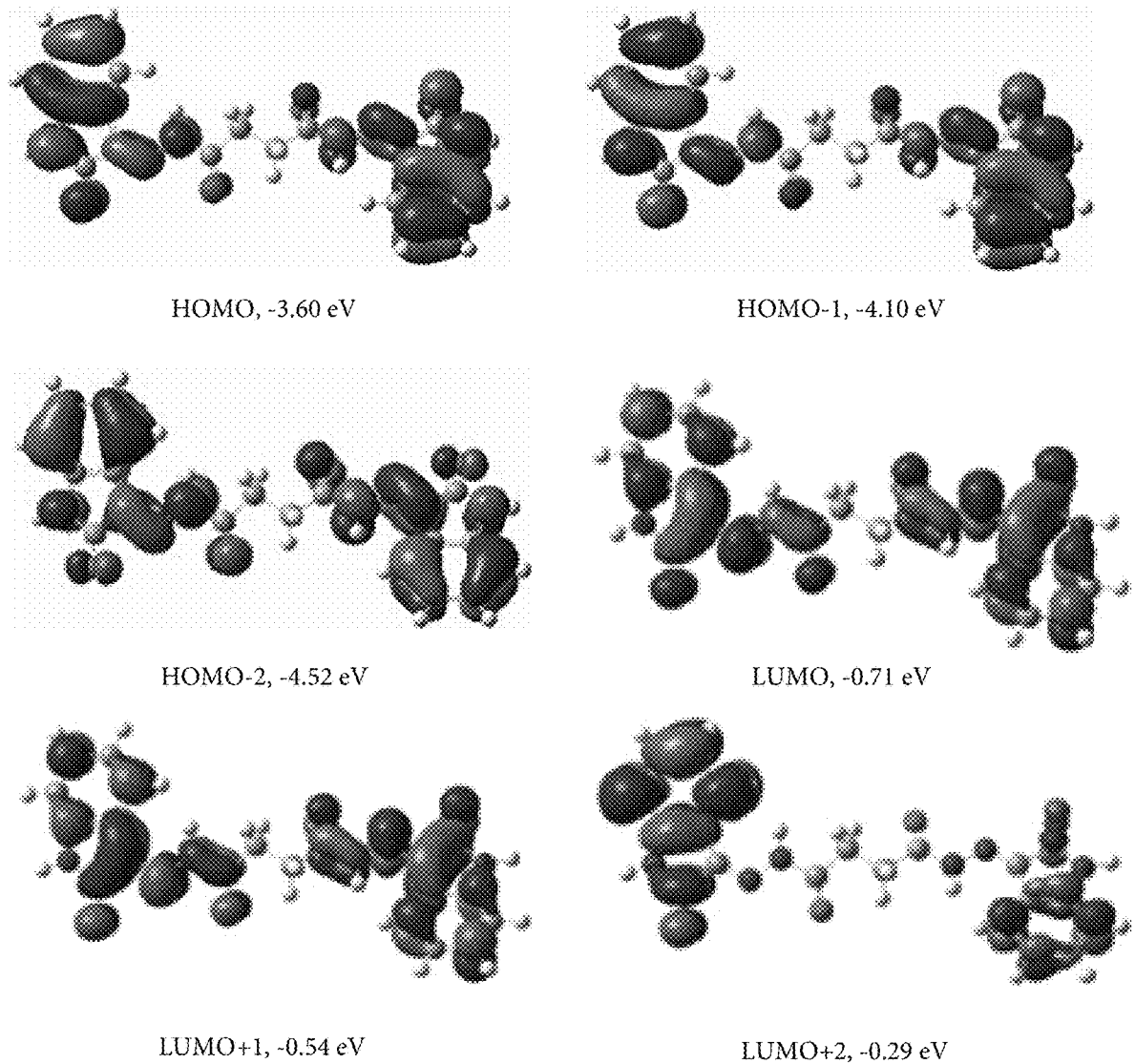
FIG. 8 shows contour plots of crucial HOMOs and LUMOs of the diisatin succinyldihydrazone ligand.
Figure 9:
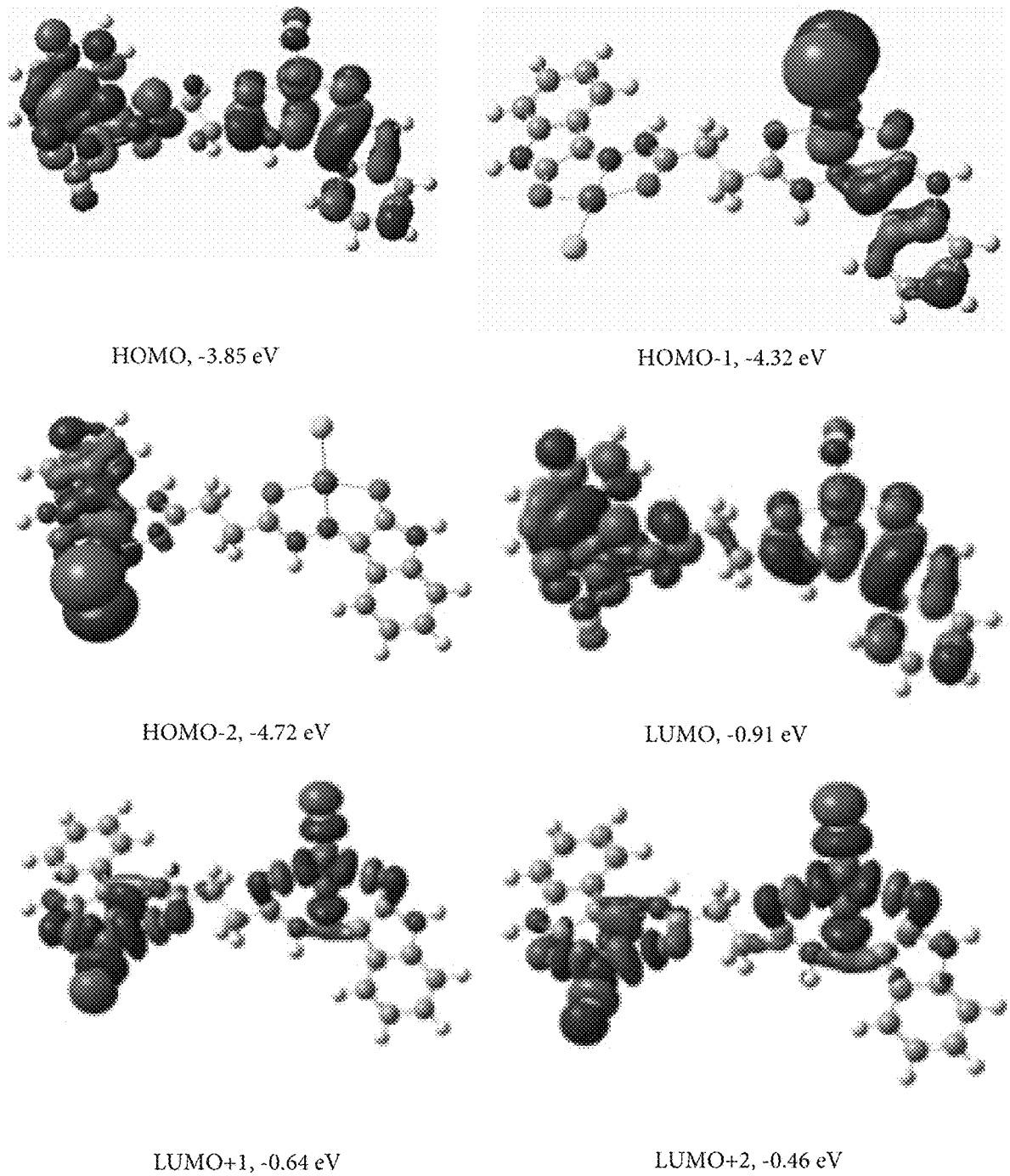
FIG. 9 shows contour plots of crucial HOMOs and LUMOs of the di-palladium (II) diaroyldihydrazone succinate complex

Quantum chemical calculations based on Density Function Theory (DFT) were carried out on the protonated free ligand (FIG. 8) and the dinuclear di-palladium (II) diaroyldihydrazone succinate complex using the GAUSSIAN09 (G09) program software (FIG. 9). Initially, the geometry optimization using the DFT method of these models was performed using B3LYP functional with 6-31G* basis set used for all ligand atoms while in the dinuclear di-palladium (II) diaroyldihydrazone succinate complex, the Lanl2DZ and 6-31G* mixed basis sets were used for the two Pd center metals and the remaining atoms, respectively using DMF as a solvent. Contour plots of the calculated crucial molecular orbitals (MOs) were plotted using the GaussView 04 package.

Geometry optimization of the 16 valence electrons (VE) dinuclear di-palladium (II) diaroyldihydrazone succinate complex predicated structural values in good agreement with a distorted square planar geometry (FIG. 9). The Pd-Pd overall distance is 9.0251 Å. Geometry optimization of the protonated ligand provides a clear overview about the possibility of this ligand to act as bi monoionic, tridentate pincer ligand κ³[N,O,O]$^-$ to coordinate two metal centers (FIG. 8). The average O-O bond distances in the coordination sphere in both halves is about 5.007 Å, the average dihedral angles between these coordinating atoms are around hydrazone moiety while the two indole fused rings are completely planar.

As representative figures of this study, the contour plots of HOMO to HOMO−2 and LUMO to LUMO+2 of the ligand and di-palladium (II) diaroyldihydrazone succinate complex are depicted in Figures X, Y respectively. For the pincer ligand, the occupied frontier orbitals HOMO to HOMO−2 are significantly delocalized over the two fused rings of indole fragment with smaller contributions of the κ³[N,O,O]$^-$ heteroatoms while the unoccupied frontier orbitals LUMO to LUMO+2 are mainly spread over the π* of the two fused rings of indole fragment with negligible contributions of two coordination sites. The occupied frontier orbitals HOMO in the di-palladium (II) diaroyldihydrazone succinate complex are mainly dominated by indol-Pd-Cl backbone, while HOMO−1 and HOMO−2 are alternatively dominated by Pd-Cl fragment suggesting a strong dπ-pπ* back donation, while the LUMOs are centered on the π* of the heteroatoms of the coordination sphere. Incorporating the $Pd^{2+}$metal lengthening of the CO, imine, and C=N bonds confirmed a strong dπ-pπ* back donation to these groups. Stretching frequencies were also calculated and compared to those obtained experimentally. The results predicted a bathochromic red shift of the stretching frequencies of C=N, C=N and C=O groups.

Example 5—Catalytic cross coupling reactions

Representatively, Suzuki-Miyaura C-C cross coupling reactions were carried out in two necked round flask connected with water circulation condenser charged with 2-bromopyridine (1.0 mmol) in 10 mL ethanol in the presence of the di-palladium (II) diaroyldihydrazone succinate complex as a homogeneous catalyst (0.002 mmol) and potassium bicarbonate (3.0 mmol). The reaction was initiated by addition of phenylboronic acid (1.2 mmol) under reflux conditions at 100° C. for 24 h in a thermostated oil bath under an aerobic atmosphere. The reaction mixture was cooled down to room temperature. The crude products were extracted by filtration because the products are quite insoluble in the reaction mixture, especially after cooling down to room temperature. The yield amounts of the target products were evaluated by dissolving the crude product diethyl ether (10 mL) and by drawing a sample portion (0.1 mL) and submitting to the GC-MS device.

The GC-MS device was a Shimadzu model of QP2010 SE. The column parameters were Rxi-5 Sil MS capillary column of 30 m length ×0.25 mm ID ×0.25 um film thickness. Detection of the products of the catalytic processes started with sample injection at 25° C. in the oven. The oven temperature was progressively increased with the rate of 10° C/min to 200° C. The temperature of the GC-oven was specified for 60 s at 40° C. With the most suitable mode, i.e. splitless mode, the inlet operation was achieved. The carrier gas was Helium with a purity of 99.999%, and its fluid rate was carried out by a rate of 1 mL.min$^{-1}$. The transfer line temperature of the mass spectral unit was taken place at 200° C. The results of the chromatogram for the detected products were studied using LabSolution software with system control.

Results

The catalytic potential of the novel di-palladium (II) complex was probed with a very loaded catalytic amount of the catalyst (0.002 mmol) in the Suzuki-Miyaura C-C cross coupling reaction, representatively, of the reaction between 2-bromopyridine and phenylboronic acid (Scheme 3) in the presence of potassium bicarbonate, as a base, under reflux for 24 h. with monitoring of the reaction modification using GC-MS. After 3 hours, the optimized yield of the reaction awards 95% of the selective C-C diaryl product. The novelty here is the very low loaded amount of the homogeneous di-palladium (II) complex catalyst compared to the reported previous catalysts of palladium (II) after a short time (3 h) to give high yields of the selective product.

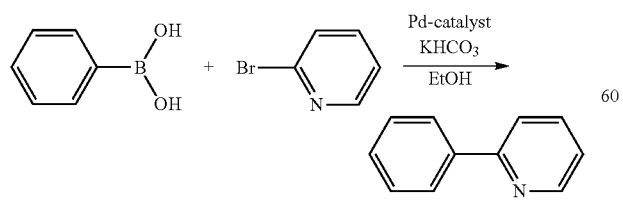

Scheme 3. Suzuki-Miyaura cross coupling reaction of 2-bromopyridine with phenylboronic acid.

It is to be understood that the present structures, their method(s) of synthesis, and uses are not limited to the specific embodiments or examples described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:
1. A homoleptic dinuclear palladium (II) diaroylhydrazone succinate complex having the 2 following structure,

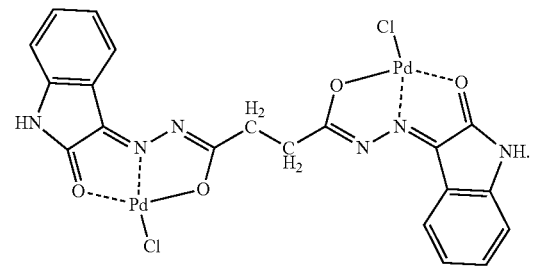

2. A method of making the homoleptic dinuclear palladium (II) diaroylhydrazone 2 succinate complex of claim 1 having the following structure,

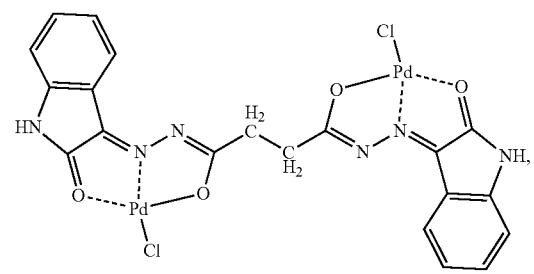

the method comprising mixing a diisatin succinyldihydrazone ligand having the following structure

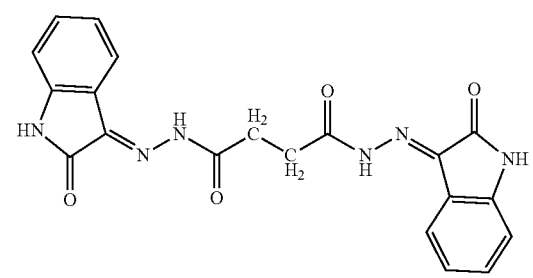 [SMILES: O=C(CCC(=O)N/N=C1/C(=O)Nc2ccccc21)N/N=C1/C(=O)Nc2ccccc21]

with PdCl$_2$ (palladium chloride) in methanol to form the homoleptic dinuclear palladium 8 (II) diaroylhydrazone succinate complex by the following reaction scheme:

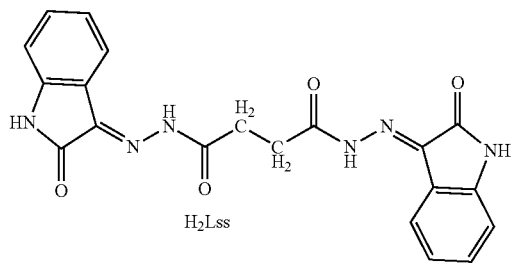

H₂Lss

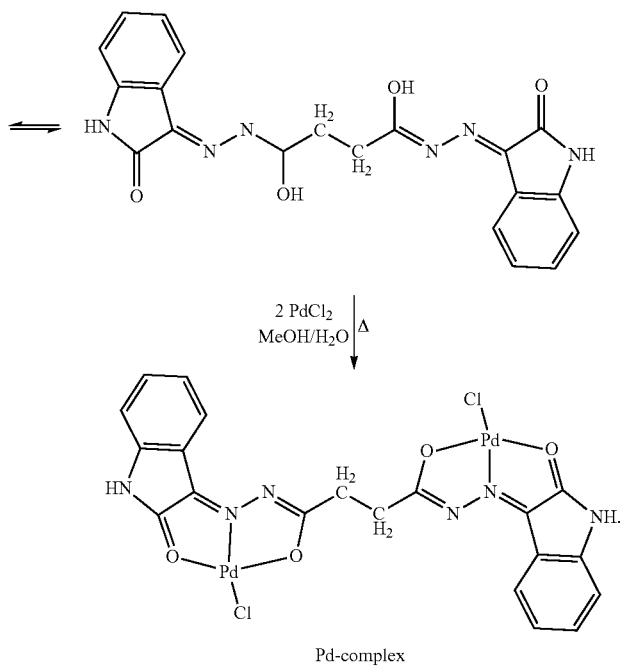

Pd-complex

3. The method of claim 2, further comprising:
pouring the diisatin succinyldihydrazone ligand in methanol into the PdCl₂ (palladium chloride) in methanol to form a complexing reaction mixture; and
stirring and refluxing the mixture for about 3 h to about 4 h at about 80° C. to about 85° C.

4. The method of claim 3, further comprising:
extracting MeOH from the complexing reaction mixture by a reduced pressure to produce a solid complex; and
aggregating the solid complex by washing with diethyl ether to produce an aggregated solid complex.

5. The method of claim 4, further comprising: recrystallizing the aggregated solid complex in methanol to obtain the homoleptic dinuclear palladium (II) diaroylhydrazone succinate complex.

6. The method of claim 2, further comprising providing an about 73% yield of the homoleptic dinuclear palladium (II) diaroylhydrazone succinate complex.

7. A method of conducting a Suzuki-Miyaura Carbon-Carbon cross coupling reaction, the method comprising:
contacting the homoleptic dinuclear palladium (II) diaroylhydrazone succinate complex of claim 1 with 2-bromopyridine and phenylboronic acid in the presence of potassium bicarbonate; and obtaining a Carbon-Carbon diaryl product.

8. The method of claim 7, wherein the Carbon-Carbon diary product is 2-phenylpyride, and wherein an about 95% yield of the 2-phenylpyridine is obtained.

* * * * *